United States Patent
Schraud

(10) Patent No.: US 11,472,357 B2
(45) Date of Patent: Oct. 18, 2022

(54) WIRING SYSTEM FOR A VEHICLE AND METHOD FOR DESIGNING AN ELECTRICAL LINE OF A WIRING SYSTEM

(71) Applicant: LEONI Bordnetz-Systeme GmbH, Kitzingen (DE)

(72) Inventor: Bernhard Schraud, Würzburg (DE)

(*) Notice: Subject to any disclaimer, the term of this patent is extended or adjusted under 35 U.S.C. 154(b) by 274 days.

(21) Appl. No.: 16/824,539

(22) Filed: Mar. 19, 2020

(65) Prior Publication Data
US 2020/0298775 A1   Sep. 24, 2020

(30) Foreign Application Priority Data

Mar. 21, 2019 (DE) .................... 10 2019 203 918.9

(51) Int. Cl.
| | | |
|---|---|---|
| B60R 16/03 | (2006.01) | |
| H01H 9/54 | (2006.01) | |
| H02H 1/00 | (2006.01) | |
| H02H 7/22 | (2006.01) | |
| B60N 2/56 | (2006.01) | |
| B62D 1/06 | (2006.01) | |

(52) U.S. Cl.
CPC ............ B60R 16/03 (2013.01); H01H 9/54 (2013.01); H02H 1/0007 (2013.01); H02H 7/226 (2013.01); B60N 2/5678 (2013.01); B62D 1/06 (2013.01)

(58) Field of Classification Search
CPC ........ B60R 16/03; H01H 9/54; H02H 1/0007; H02H 7/226; B60N 2/5678; B62D 1/06
USPC .......................................................... 307/9.1
See application file for complete search history.

(56) References Cited

U.S. PATENT DOCUMENTS

| | | | | |
|---|---|---|---|---|
| 6,628,491 B1* | 9/2003 | Tihanyi | .................... | H02H 5/04 |
| | | | | 361/103 |
| 9,673,803 B2* | 6/2017 | Uemura | ............... | H03K 17/145 |
| 10,807,628 B2* | 10/2020 | Tsuji | ...................... | B62D 1/046 |

(Continued)

FOREIGN PATENT DOCUMENTS

| | | |
|---|---|---|
| DE | 2005011235 U1 | 12/2006 |
| DE | 102011122022 A | 6/2013 |

(Continued)

OTHER PUBLICATIONS

European Search Report received in EP 20020036.8, dated Jul. 23, 2020.

*Primary Examiner* — Ryan Jager
(74) *Attorney, Agent, or Firm* — Verrill Dana, LLP; Robert L. Hover

(57) ABSTRACT

A wiring system for a vehicle is specified, which has a voltage source and an electrical load, whereby a need for the electrical load depends on an external condition. Furthermore, the wiring system has a load path with an electrical line, which connects the voltage source to the electrical load, and a first switching element, which is arranged in the load path, for disconnecting the electrical load from the voltage source, wherein a working range of the external condition is defined, within which the function of the electrical load is reasonable, and a control unit is arranged, which is designed in such a way that a switching on of the electrical load is prevented if the external condition lies outside the working range. Furthermore, a method for the design of an electrical line of such a wiring system is given.

19 Claims, 2 Drawing Sheets

(56) References Cited

U.S. PATENT DOCUMENTS

| | | | | |
|---|---|---|---|---|
| 2011/0134575 A1* | 6/2011 | Ward | ............... | H02H 5/042 |
| | | | | 361/42 |
| 2018/0191147 A1 | 7/2018 | Graf | | |
| 2018/0292443 A1* | 10/2018 | Li | ............... | H03K 5/24 |
| 2019/0202383 A1* | 7/2019 | Odate | ............... | B60R 16/03 |
| 2021/0138983 A1* | 5/2021 | Sato | ............... | H03K 3/017 |
| 2021/0186231 A1* | 6/2021 | Amman | ............... | A47C 31/126 |

FOREIGN PATENT DOCUMENTS

| | | |
|---|---|---|
| DE | 102011122022 A1 | 6/2013 |
| DE | 202014003691 U | 7/2014 |
| DE | 102013214726 A1 | 1/2015 |
| DE | 102013225732 A1 | 6/2015 |
| DE | 102017131359 A1 | 7/2018 |
| WO | 2007/009675 A | 1/2007 |

\* cited by examiner

WIRING SYSTEM FOR A VEHICLE AND METHOD FOR DESIGNING AN ELECTRICAL LINE OF A WIRING SYSTEM

CROSS-REFERENCE TO RELATED APPLICATION

This application claims the benefit, under 35 U.S.C. § 119, of German patent application DE 10 2019 203 918.9, filed Mar. 21, 2019; the prior application is herewith incorporated by reference in its entirety

FIELD OF THE INVENTION

The invention relates to a wiring system for a vehicle and a method for designing an electrical line of such a wiring system.

BACKGROUND OF THE INVENTION

In vehicles, especially motor vehicles, electrical energy is distributed by means of a wiring system. For this purpose, the wiring system usually has several electrical lines that connect a voltage source, such as the vehicle battery, to one or more electrical loads of the vehicle.

Nowadays, the electrical lines in the vehicle wiring system are designed and dimensioned in such a way that a maximum (specified) electrical current during operation of the wiring system does not thermally damage the electrical lines.

The thermal load of the electrical lines is also influenced by, for example, the ambient temperature of the respective electrical line. The motor vehicles and thus also the wiring system are typically designed for use at outside temperatures over a temperature range of e.g. −40° C. up to 85° C. or even up to 120° C.

In order to achieve at least a required operating time and thus, in return, not to exceed a maximum line temperature (which results from the current-flow induced heating of the electrical line and the ambient temperature), nowadays electrical lines are preferably "oversized" with regard to their line cross-sections. This means that the lines have a larger line cross section than they would/must have with regard to their maximum expected thermal load. However, this oversizing is associated with considerable additional costs and an increase in weight.

SUMMARY OF THE INVENTION

On this basis an object of the invention is to provide a wiring system which is designed and manufactured in a cost and material saving manner.

According to the invention, the object is achieved by an electrical wiring system for a vehicle. The wiring system comprising:
at least one voltage source and at least one electrical load, wherein a need for the operation of the electrical load depends on an external condition and the wiring system is designed for a maximum operating range of the external condition,
a load path with at least one electrical line, the load path connects the voltage source to the electrical load and
a first switching element which is arranged in the load path, for separating the electrical load from the voltage source, wherein—
a working range of the external condition is defined, which is smaller than the maximum operating range a control unit is arranged, which is designed in such a way that a switching on of the electrical load is prevented if the external condition lies outside the working range.

Advantageous embodiments and further developments and variants are disclose in the dependent claims.

The wiring system is designed and used in particular for a vehicle and especially for a motor vehicle. It has a voltage source and an electrical load. A need for operation of the electrical load depends on an external condition. Furthermore, the wiring system has a load path with an electrical line that connects the voltage source with the electrical load. The external condition is understood to be a condition outside the wiring system. Therefore, this external condition is not a property of the load itself, nor is it a property of the load path.

In addition, the wiring system has a first switching element, which is located in the load path. The first switching element serves to separate the electrical load from the voltage source. The load path defines the electrical connection between the power source and the load and includes in particular the electrical line and the first switching element.

The wiring system is designed in general, i.e. by default for a (maximum) operating range of the external condition, for example temperature. This means that the individual components of the wiring system, e.g. the lines, electronic components, switches, etc. are designed for this maximum operating range by default.

Furthermore, a working range of the external condition is defined within which the function of the load makes sense. This means that it only makes sense to use the electrical load within the working range of the external condition. This working range is smaller than the maximum operating range.

Furthermore, a control unit is arranged within the wiring system, which is designed in such a way that the load is prevented from being switched on if the external condition is outside the working range. This ensures that the electrical load for example can only be "called up" by the driver if the external condition is within the working range. The working range is a sub-range of the maximum operating range of the external condition for which the wiring system is designed by default. By this measure therefore a section of the wiring system is designed for a different working range than other sections of the wiring system.

By preventing the load from being switched on when the external condition is outside the working range, an optimization of the wiring system with regard to a loading of the electrical line is achieved. The electrical load is therefore always switched off, if, for example, ambient conditions do not make it appear reasonable to switch on the electrical load. Manual activation is therefore effectively prevented in these states. In other words, the load is not "unnecessarily" put into operation. This enables the wiring system and in particular its design to be advantageously designed with regard to material savings and thus cost reduction.

Preferably, the external condition is an external temperature. This is in particular the ambient temperature in the area of the load and/or the ambient temperature outside the vehicle or also the temperature of a operating resources in the vehicle. The working range is a predefined temperature range with an upper temperature limit, followed by a further working range up to a maximum temperature. The upper temperature limit of the specified temperature range, for example, has a value above 25° C. and less than or equal to 35° C. or less than or equal to 40° C. or less than or equal to 50° C.

This embodiment is based on the idea that the electrical load can preferably not be switched on when the upper temperature limit is reached or exceeded. This also limits the maximum line temperature caused by the flow of current through the electrical line and allows the line to be dimensioned smaller overall.

The maximum temperature is the temperature that can be reached, for example, in the vicinity of the load, especially a maximum ambient temperature outside the vehicle, and for which the wiring system is designed, at least in part. The maximum temperature is for example 85° C. or even higher, e.g. 120° C.

The maximum temperature is preferably 10° C. or 20° C. and in particular 30° C. or 50° C. higher than the upper temperature limit. The further working range is preferably understood to be a working or operating range of the wiring system, for example with regard to a maximum design temperature (for which the wiring system is designed). It is basically possible to operate the electrical load above the upper temperature limit (i.e. within the further working range). However, a need for operation of the load within the further working range is typically not practical or necessary.

Preferably, the upper temperature limit can also be dynamically adjusted, for example via the control unit, and is adjusted if necessary, e.g. increased by a specified value, especially in the short term. Depending on the type of load, at least an emergency operation of the load may be necessary. In addition to raising the temperature limit, i.e. to avoid a forced switch-off of the load, a current limiter is preferably provided. This means that in this special operating case (emergency operation) the load is supplied with a current that is less than a maximum load current at best.

In general, the working range, i.e. especially the specified temperature range, is therefore variable in operation in a preferred embodiment. This means that, depending on the priority of the consumer, the working range can be dynamically adapted, for example, to continue to supply a safety-relevant function if necessary and/or to ensure emergency operation.

As an alternative to this variability, the working range is fixed and cannot be changed during operation of the vehicle, e.g. after production and delivery.

The electrical line has a line cross section that is only designed to supply the load within the working range at a maximum operating temperature of the line. This design is based on the consideration that the electrical load is (must be) preferably supplied with electrical energy by means of the electrical line only within the working range and thus the maximum line temperature must be designed only for this working range. The maximum working temperature is understood here to be a temperature which consists of the outside temperature in a close range of the electrical line and the current-related heating of the electrical line.

The electrical line is in particular a single-core line. Alternatively, the electrical line is a multi-core line, with each of the cores supplying the load.

The design and calculation of a line cross section is usually carried out according to standards or other regulations, for example according to VDE 0298. In addition to geometrical factors, such as the type of installation (single-core, multi-core), the installation location of the line, etc., decisive factors for the design are a maximum supply current that should flow through the line, as well as the maximum temperature.

The standards and regulations usually indicate—for given geometry factors and installation locations—different current carrying capacities for different line cross sections, typically for a defined line temperature at e.g. 30° C. For example, the current carrying capacity of a single-core 0.75 $mm^2$ core laid in air is 15 A according to VDE 0298 T4 06/13, Table 11. For a 25 $mm^2$ core, the current carrying capacity is 129 A. The required cross section depends strongly on the ambient temperature. This is, for example, taken into account by a conversion factor in accordance with the VDE standard 0298 T4 06/13 mentioned above, in Table 17. At 30° C. this is 1.0 and at 50° C. already 0.71 and at 65° C. 0.35.

The measure taken in accordance with the invention, namely to prevent the load from operating at a certain upper temperature limit, therefore results in a considerable saving in the material required for the lines, as these can be designed with significantly smaller cross-sections (compared to a design for the maximum operating temperature).

The conductor cross-section of the electrical line is thus smaller than it would be required to supply the electrical load in the further working range and thus, for example, in the entire operating range of the wiring system—with otherwise identical parameters, in particular with otherwise identical line construction (single-core multi-core; material and construction of the conductor and the core insulation). Preferably, the line cross section is smaller by at least a factor of 2, preferably by at least a factor of 5 and in particular by at least a factor of 10 than the line cross section that would be required to supply the load in the further working range (up to the maximum temperature). By reducing the line cross section, a reduction of line material and thus a reduction of costs and weight is achieved.

The savings are particularly noticeable in lines that are designed for high current carrying capacity and that are intended to supply loads with a high current need.

The line is specially designed for a current carrying capacity of at least 30 A, preferably at least 60 A and in particular of at least 100 A.

In particular, the electrical load is an electrical heating system. In the simplest case, the heating system is an electric heating element. Alternatively it has at least one such electrical heating element. The heating system can therefore preferably not be switched on at all if the external condition is outside the working range.

According to a first variant, the heating system or heating element supports a comfort function for the vehicle occupants to give them a feeling of warmth. In particular, the heating element is intended for heating a passenger compartment, a vehicle seat and/or a steering wheel. Preferably, heating elements are provided for one or more or all of these previously mentioned components.

Alternatively or in addition, the heating element serves according to a second variant for heating an operating resource of the vehicle. In this context, operating resource of the vehicle is understood to be, in particular, an engine and/or transmission oil.

Alternatively or in addition, it is a heating element for heating a vehicle window, in particular the front and/or rear window, and/or for heating the vehicle mirrors, in particular the side mirrors, and/or other vehicle systems.

With the electrical load designed as an electrical heating element, the temperature-dependent switch-off has proven to be particularly advantageous and suitable. For example, it can be assumed that a heating function to heat the passenger compartment at ambient temperatures above 30° C. is not required by a driver. In this case, the upper temperature limit of the working range would be, for example, 30° C., so that above this temperature, switching on or the function of the heating element is prevented.

As a further example, the already mentioned function of the heating element is used here, as a heating element for heating an operating resource of the vehicle.

In particular, contrary to the above example, the external or ambient temperature of the vehicle is not defined as an external condition, but rather, for example, an engine temperature of the vehicle is defined as the external condition. If the measuring device and the control unit now detect during operation that the engine is warm, for example, the function of the heating element for heating the operating resource is prevented.

By suppressing the electrical load, especially the function of the heating element above a specified temperature limit, it is ensured that a maximum line temperature of the electrical line supplying the heating element (under normal conditions) is preferably not reached. Therefore, the line must be designed for operation up to the specified temperature limit and, in particular, only within the working range.

Preferably, the electrical line has several line elements, in particular individual cores, via which the load is supplied with current in each case. The supply of the load is therefore done by several line elements. Furthermore, each of these line elements contains an electronic switching element, in particular a semiconductor switch such as a transistor, for switching the electrical load. The several electronic switching elements therefore together define the first switching element for switching the load. This design is based on the consideration that in the case of large consumers, e.g. heating elements, the limitation of the temperature range initially results in smaller required line cross-sections. Due to the additional distribution of the load path over several line elements, these only need to be designed for a comparatively low current carrying capacity overall, which can then be switched by electronic switching elements. Each switching element is designed e.g. for switching currents up to max. 10 A, up to max. 20 A or up to max. 30 A. Compared to previous systems, this measure therefore eliminates the need for a cost-intensive switching relay, resulting in cost savings also with regard to the switching element.

For example, the bundle of measures described here replaces an electrical, single-core line with a conductor cross-section of 25 mm$^2$ and a switching relay (for supplying a heating element with several kW of heating power) with a multi-core, in particular three-core line, each individual core having a conductor cross-section of only 1.5 mm$^2$ and each being connected to an electronic switching element. The total conductor cross-section and thus the total volume for the required conductor material has therefore been reduced by approx. 80% in this example (reduction from 25 mm$^2$ to a total of 4.5 mm$^2$).

Preferably, the first switching element is set up for the normal switching on of the load during operation. The normal switching on of the load during operation is understood here to mean that the driver can switch the load on or off using the first switching element, for example during driving. The control unit is also set up to block switching of the first switching element if the external condition is outside the operation range. This ensures reliable prevention of switching on the load if, for example, the external condition reaches or exceeds the upper temperature limit.

In accordance with preferred embodiment, a second switching element is also located within the wiring system. According to this embodiment, the control unit is set up in such a way that the load is disconnected via the second switching element if the external condition is outside the working range. This embodiment is based on the idea of disconnecting the electrical load by means of the second switching element independently of a switching state of the first switching element. This is particularly the case if, for example, the driver has switched on the electrical load by means of the first switching element and now, for example, due to a change in the ambient temperature, the external condition is outside the working range. Here, for example, a switching signal is transmitted by and through the control unit to the second switching element, so that the load is separated from the voltage source.

According to a preferred embodiment, at least the first switching element is arranged in a power distributor to which the electrical line is connected. At least the first switching element is thus arranged in a so-called pre-fuse level. In this context, the pre-fuse level is understood to be an area within the wiring system which is preferably located in the vicinity of the voltage source and from which the electrical lines lead to the individual loads. The arrangement of the pre-fuse level in a close range of the voltage source has proven to be advantageous, especially for spatial and safety reasons. Usually, a fuse element is additionally arranged in the power distributor, for example per current path. The arrangement of at least the first switching element in the power distributor has the advantage that the largest possible line length can be designed with the already mentioned smaller line cross section.

According to an alternative design, the first switching element has an integrated fuse, for example in the manner of a safety fuse to protect the electrical line against an overcurrent. Furthermore, as an alternative and in particular to the arrangement of at least the first switching element in the pre-fuse level, the first switching element is arranged in the load path before such a fuse.

Preferably, the wiring system has a measuring device to determine the external condition. Furthermore, the measuring device is preferably designed to measure a present temperature of the electrical line. The measurement of the present temperature of the electrical line is used to determine the external condition.

The measuring device is preferably designed to determine the present temperature by at least one of the following methods:

a direct measurement of the temperature of the electrical line and/or an indirect measurement of the present operating temperature of the electrical line by means of the resistance of the electrical line and/or a measurement of the present operating temperature in a component of the wiring system.

The direct measurement of the temperature of the electrical line is carried out, for example, by means of a temperature sensor which is preferably located directly on the electrical line to be measured. The indirect measurement of the actual temperature of the electrical line by means of the line resistance is based on the consideration that the line resistance is preferably correlated proportionally with the line temperature. Thus, if necessary, the line temperature can be inferred from the determined resistance of the electrical line with the help of an evaluation unit.

Under the measurement of the present temperature in a component of the wiring system it is understood that the measuring device receives a temperature signal, for example from a control unit of the vehicle, which in turn receives the temperature value, for example from a temperature sensor located inside the vehicle. The transmission of the temperature signals to the measuring system is done, for example, via a BUS communication system. In addition or as an alternative, it is possible to draw conclusions about the temperature of the electrical line, taking into account the date, location and/or season.

The above-mentioned methods for determining temperature make it possible to determine the temperature of the electrical line in several ways and in each case easily. This means that the temperature determination of the electrical line is not limited to one method and can therefore be applied, for example, to different types of vehicle wiring systems and/or vehicle types for which, for example, different temperature determination methods have proven to be suitable (especially from a technical point of view).

According to the invention, the object is further achieved by a method for designing an electrical line of an wiring system for a vehicle, the wiring system comprising a voltage source and an electrical load, wherein the need for the electrical load depends on an external condition, a load path with an electrical line, which connects the voltage source to the electrical load, and a first switching element, which is arranged in the load path, for separating the electrical load from the voltage source, where a working range of the external condition is defined, the wiring system being designed for a total operating range of the external condition which is larger than the working range.

a line cross section of the line is determined as a function of the working range, so that the electrical line is designed with regard to the line cross section only for operation within the working range and not within the total operating range.

The wiring system is in particular the wiring system described above, which has a voltage source as well as an electrical load, a load path with an electrical line and a first switching element. The first step of the method is to define a working range of the external condition, preferably the external temperature and the working range within which the function of the load makes sense. In a second method step, a cross-section of the line is then determined as a function of the defined working range, so that the electrical line is designed with regard to the line cross-section for operation within the working range.

The advantages and preferred embodiments mentioned with regard to the wiring system are to be transferred to the procedure by analogy and vice versa.

Embodiments of the invention are explained in more detail below using the figures.

DETAILED DESCRIPTION OF THE INVENTION

In the figures, parts with the same function are always shown with the same reference signs.

Figure 1:
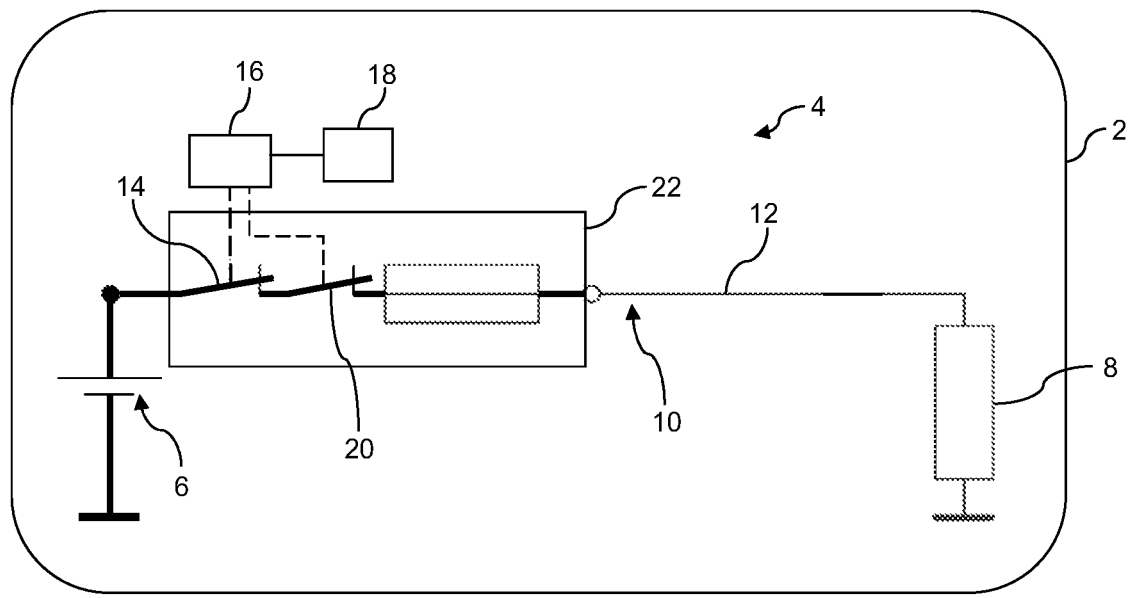
FIG. 1 is a wiring system of a motor vehicle according to a first design variant.

FIG. 1 shows a vehicle 2 with an wiring system 4 according to a first design variant. Vehicle 2 is in particular a motor vehicle. The wiring system 4 has a voltage source 6 and an electrical load 8. The electrical load 8 in the exemplary embodiment is an electrical heating element, which is in particular a heating element for heating a passenger compartment or a heating element for heating a fuel of vehicle 2. A need for the electrical load 8 depends on an external condition. The external condition is understood here as a condition for the need of the electrical load, which is in particular not a characteristic of the load itself.

The wiring system 4 also has a load path 10 with an electrical line 12, which connects the voltage source 6 with the electrical load 8.

In the exemplary embodiment example shown in FIG. 1, the wiring system 4 has a first switching element 14, which is located in load path 10. The first switching element 14 is used to isolate the electrical load 8 from the voltage source 6. The first switching element 14 is especially designed for normal switching on of the load 8 during operation. I.e. it is preferably operated by a driver of vehicle 2.

Furthermore, an working range $A_B$ (see FIG. 3) of the external condition is defined, within which a function of the electrical load 8 is useful.

The wiring system 4 also has a control unit 16, which is designed in such a way that the electrical load 8 is prevented from being connected if the external condition is outside the operating range and thus a function and in particular operation of the function of the electrical load 8 is not practical.

In the exemplary embodiment shown in FIG. 1, the external condition is an external temperature. The working range $A_B$ is a specified temperature range with an upper temperature limit $T_o$, followed by a further working range $B_W$ (see FIG. 3).

The wiring system 4 has a measuring device 18 to detect the external condition. The measuring device 18 is electrically connected to the control unit 16 in the exemplary embodiment. This makes it possible, for example, for the measuring device 18 to transmit a signal to the control unit 16 after the external condition, i.e. the external temperature, has been detected, which contains information about the detected external temperature. On the basis of the signal received with the temperature information, a check is then carried out by means of control unit 16, for example, to determine whether the external condition, i.e. the determined external temperature is outside the (specified) working range. If the external condition is outside the working range, control unit 16 prevents load 8 from being connected. For this purpose, the control unit 16 is electrically connected to the first switching element 14 in such a way that the control unit 16 transmits e.g. a switching signal to the first switching element 14, on the basis of which the switching on of the electrical load 8 is prevented.

By preventing the switching on of the electrical load 8 by means of the first switching element 14 or the switching off of the electrical load 8 by means of the second switching element 20, if the external condition is outside the working range, the advantage is achieved that, especially when using the external temperature as an external condition, a lower temperature load of the electrical line 12 is achieved during operation. This makes it possible to design a conductor cross-section of electrical line 12 for a lower temperature range and thus for a lower maximum temperature that occurs, thus saving material and costs.

Furthermore, a second switching element 20 is arranged in the wiring system 4. The control unit 16 is also set up to cause the electrical load 8 to be disconnected via the second switching element 20 if the external condition is outside the working range. This embodiment is based in particular on the idea that not only the switching on of the electrical load 8 should be prevented, but also that the electrical load 8 should be switched off if, for example, during operation the external condition is outside the working range.

The second switching element 20 is arranged in series with the first switching element 14 in the exemplary embodiment. In normal operation of the wiring system 4 and in particular of the electrical load 8, the second switching element 20 is in a closed, i.e. conducting, state. Preferably, the first switching element 14 is used to prevent the electrical load 8 from being switched on. Only when this has been switched on (normally) by a driver of vehicle 2, for example, and the external condition is outside the working range, the second switching element 20 opens, thus disconnecting the electrical load 8 from the voltage source 6. The second switching element 20 is also electrically connected to the control unit 16.

In the exemplary embodiment shown in FIG. 1, the first switching element 14 and the second switching element 20 are arranged in a power distributor 22. The electrical line 12 is connected to the power distributor 22.

The arrangement of the first switching element 14 and the second switching element 20 in the power distributor 22 makes it possible to form the longest possible length of the electrical line 12 with the reduced line cross section. The cost and material advantage is favorably influenced in this respect. This design is based on the idea that such power distributors 22 are usually located in a close range of the voltage source 6, for example the vehicle battery, and thus a large part of the electrical line 12 is "available" for a smaller cross-sectional design.

In the exemplary embodiment according to FIG. 1, a fuse 24 is also located in the power distributor 22. The fuse serves to protect the electrical line 12 against an overcurrent. In the exemplary embodiment according to FIG. 1, fuse 24 is arranged serially to the second switching element 20. The fuse 24 is therefore (locally viewed) located between the second switching element 20 and the electrical load 8. Fuse 24, for example, is a conventional safety fuse. The first switching element 14 and the second switching element 20 are therefore arranged in the exemplary embodiment in a so-called pre-fuse level.

Alternatively, only one or two components selected from the first switching element 14, the second switching element 20 and the fuse 24 are arranged in the power distributor 22.

Figure 2:
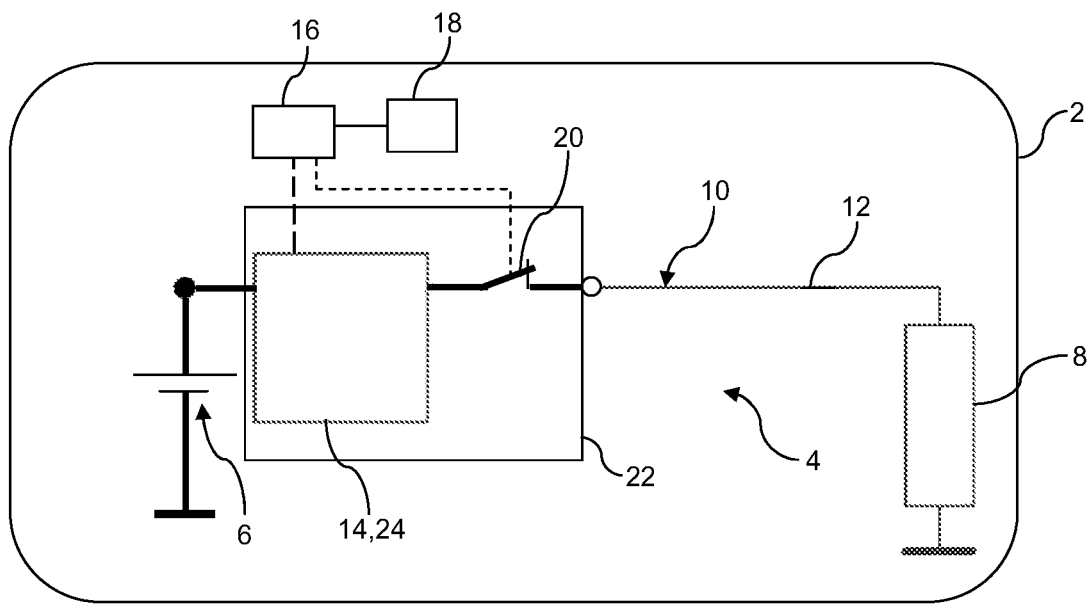
FIG. 2 the wiring system of the motor vehicle according to a second design variant.

FIG. 2 shows a wiring system 4 of a vehicle 2 according to a second design variant.

The wiring system 4 has essentially the same components as the wiring system 4 according to the first design variant according to FIG. 1, i.e. the wiring system 4 has a voltage source 6 and an electrical load 8, whereby the need for the electrical load 8 also depends on an external condition. In addition, the wiring system 4 has a load path 10 with an electrical line 12, which connects the voltage source 6 with the electrical load 8.

The wiring system 4 according to the second design variant also has a first switching element 14, which is arranged in the load path and is designed to separate the electrical load 8 from the voltage source 6. However, in the second exemplary embodiment according to FIG. 2, the first switching element 14 has a fuse 24, i.e. fuse 24 is integrated in the first switching element 14. For this reason, fuse 24 is also referred to as an integrated fuse 24.

The first switching element 14 receives—analogous to the first exemplary embodiment according to FIG. 1—switching signals from a control unit 16, which is also located within the wiring system 4 and is electrically connected to the first switching element 14.

Furthermore, the wiring system 4 according to FIG. 2 has a second switching element 20, which is designed to disconnect the electrical load 8 from the voltage source 6 if the external condition is outside the working range $A_B$.

The external condition, in this case the external temperature, is determined in the exemplary embodiment according to FIG. 2 by means of a measuring device 18, which is located within the wiring system 4 and electrically connected to the control unit 16.

In the exemplary embodiment shown in FIG. 2, the second switching element 20 and the component formed by the first switching element 14 and the fuse 24 are arranged together in a power distributor 22.

Figure 3:
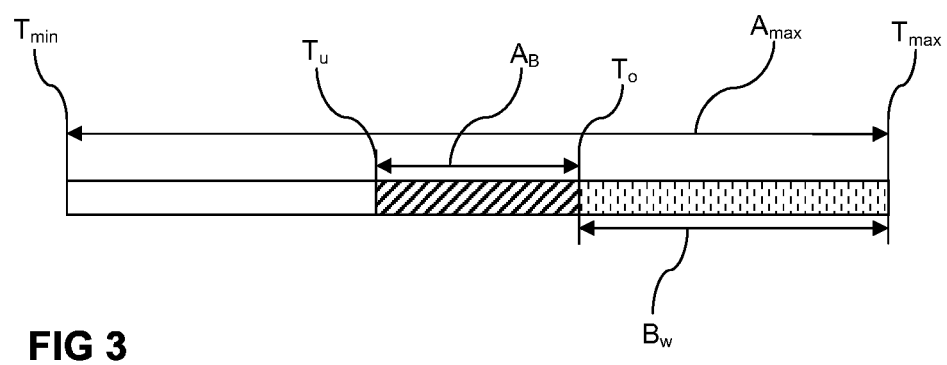
FIG. 3 an illustration of an operating range of the wiring system.

FIG. 3 shows a sketched illustration of an operating range $A_{max}$ of the wiring system 4. The operating range $A_{max}$ is understood to be a maximum operating range of the wiring system 4, in particular a maximum temperature operating range $A_{max}$ of the wiring system 4. I.e. the maximum operating range $A_{max}$ according to FIG. 3 indicates from which minimum design temperature $T_{min}$ to which maximum design temperature $T_{max}$ the load paths 10 and in particular the line cross-sections of the load paths 10 of the wiring system 4 are designed. In other words, the electrical lines 12 must be designed with regard to their cross section in such a way that they are not thermally damaged during operation within the Amax operating range.

The operating range $A_{max}$ of the wiring system 4 has a working range $A_B$ with a lower temperature limit $T_u$ and an upper temperature limit $T_o$. Alternatively, the lower temperature limit $T_u$ can be omitted. In this case the lower temperature limit $T_u$ is the minimum design temperature $T_{min}$. The working range $A_B$ defines a usually reasonable temperature range for the switching on of the electrical load 8 which is connected to the voltage source 6 with the corresponding load path 10. That means within the working range $A_B$ it seems to make sense for a driver of vehicle 2, for example, to switch on and operate the function of electrical load 8.

The upper temperature limit $T_o$ is followed by a further working range $B_W$, within which operation of the electrical load 8 is possible in principle, but no longer appears to be sensible from the point of view of the driver of vehicle 2. For example, switching on or operating an electrical load 8 designed as an electrical heating element to heat an interior of vehicle 2 above a certain temperature, for example above 40° C., does not appear to be sensible or even wanted by the driver of vehicle 2. The 40° C. of the example described above corresponds to the upper temperature limit $T_o$.

The invention is not limited to the exemplary embodiments described above. Rather, other variants of the invention can be derived from it by the person skilled in the art without leaving the subject matter of the invention. In particular, all individual features described in connection with the exemplary embodiments can also be combined with each other in other ways without leaving the subject matter of the invention.

The invention claimed is:

1. A wiring system for a vehicle comprising:
    at least one voltage source and at least one electrical load, wherein a need for the operation of the electrical load depends on an external condition and the wiring system is designed for a maximum operating range of the external condition;
    a load path with at least one electrical line, the load path connects the voltage source to the electrical load; and
    a first switching element, which is arranged in the load path, for separating the electrical load from the voltage source,
    wherein:

a working range of the external condition is defined, which is smaller than the maximum operating range;

a control unit is arranged, which is designed in such a way that a switching on of the electrical load is prevented if the external condition lies outside the working range; and a second switching element is arranged and the control unit is arranged to cause disconnection of the load via the second switching element when the external condition is outside the working range.

2. The wiring system according to claim 1, wherein the external condition is an external temperature and the working range is a predetermined temperature range with an upper temperature limit followed by a further working range up to a maximum temperature.

3. The wiring system according to claim 2, in which the upper temperature limit is dynamically adjusted if necessary.

4. The wiring system according to claim 2, wherein the difference between the upper temperature limit and the maximum temperature is at least 30° C., preferably at least 50° C.

5. The wiring system according to claim 1, wherein the maximum temperature is at least 80° C. and in particular at least 100° C. or at least 120° C.

6. The wiring system according to claim 1, wherein the electrical line has a line cross-section which is designed only for supplying the load within the working range.

7. The wiring system according to claim 6, wherein the line cross-section is smaller by at least a factor of 2 and preferably by at least a factor of 10 than a conventional line cross-section which would result from a design for the maximum temperature.

8. The wiring system according to claim 1, wherein the electrical line is designed for a current carrying capacity of at least 30 A, preferably of at least 60 A and more preferably of at least 100 A.

9. The wiring system according to claim 1, wherein the electrical load is an electrical heating element which is used to heat one or more of:
 a passenger compartment;
 a vehicle seat;
 a steering wheel; or
 an operating fluid of the vehicle.

10. The wiring system according to claim 1, wherein the electrical load is a PTC heating element.

11. The wiring system according to claim 1, wherein the electrical line has several supply cores, and an electronic switching element for switching the electrical load is arranged in each supply core.

12. The wiring system according to claim 1, wherein the first switching element is arranged for normally switching of the load during operation, and the control unit is arranged to block switching of the first switching element when the external condition is outside the working range.

13. The wiring system according to claim 1, wherein at least the first switching element is arranged in a power distributor to which the electrical line is connected.

14. The wiring system according to claim 1, wherein the first switching element has an integrated fuse for protecting the electrical line against overcurrent or is arranged in the load path before such a fuse.

15. The wiring system according to claim 1, further comprising a measuring device for detecting the external condition.

16. The wiring system according to claim 15, wherein the measuring device is adapted to measure a present temperature of the electric line to determine the external condition.

17. The wiring system according to claim 16, wherein the measuring device is arranged to determine the present temperature by at least one of:
 a direct measurement of the temperature of the electrical line and/or
 an indirect measurement of the present temperature of the electric line by means of the resistance of the electrical line,
 a measurement of the present temperature in a component of the wiring system.

18. A method for designing an electrical line of an wiring system for a vehicle, the wiring system comprising:
 a voltage source and an electrical load, wherein the need for the electrical load depends on an external condition;
 a load path with an electrical line, which connects the voltage source to the electrical load; and
 a first switching element, which is arranged in the load path, for separating the electrical load from the voltage source;
 wherein:
  a working range of the external condition is defined, the wiring system being designed for a total operating range of the external condition which is larger than the working range;
  a line cross section of the line is determined as a function of the working range, so that the electrical line is designed with regard to the line cross section only for operation within the working range and not within the total operating range; and
  a second switching element is arranged and the control unit is arranged to cause disconnection of the load via the second switching element when the external condition is outside the working range.

19. The method according to claim 18, wherein the external condition is an external temperature and the working range is a predetermined temperature range with an upper temperature limit which is followed by a further working range and wherein the line cross-section is undersized for the further working range.

* * * * *